June 30, 1953   A. D. MacLEAN   2,643,677
APPARATUS FOR OPERATING ROTARY VALVES
Filed Sept. 14, 1948   2 Sheets-Sheet 1

INVENTOR.
ALLEN D. MacLEAN
BY Edward Hoopes III
his attorney

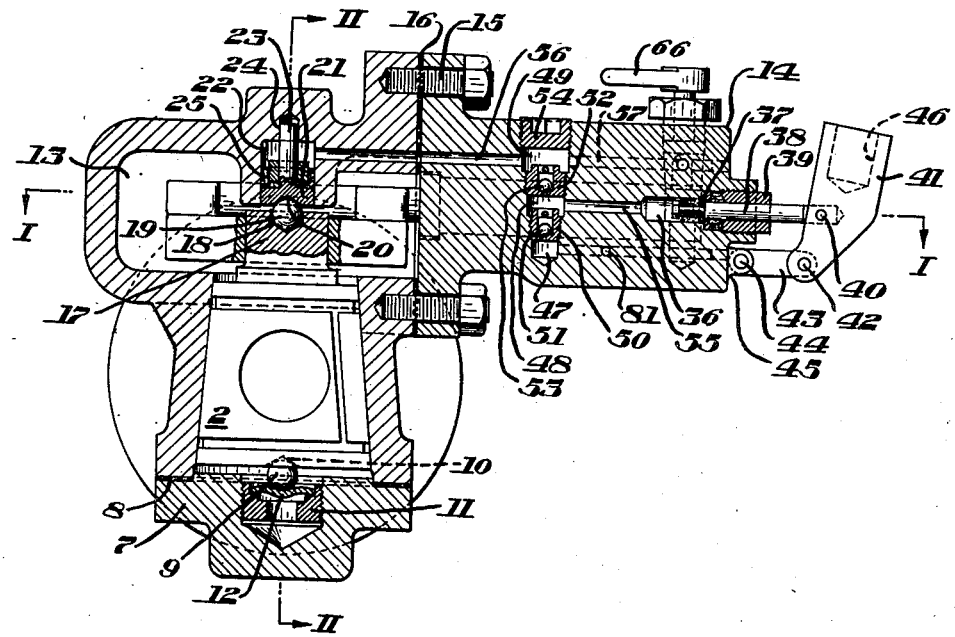

Patented June 30, 1953

2,643,677

UNITED STATES PATENT OFFICE 2,643,677

APPARATUS FOR OPERATING ROTARY VALVES

Allen D. MacLean, Pittsburgh, Pa., assignor, by mesne assignments, to The Ohio Injector Company, Wadsworth, Ohio, a corporation of Ohio Application September 14, 1948, Serial No. 49,181

2 Claims. (Cl. 137—658)

This invention relates to apparatus for operating rotary valves and especially rotary plug valves. In certain of its aspects it relates particularly to apparatus for operating tapered rotary plug valves.

My invention provides a number of improvements in apparatus for operating rotary valves which render the valve operation more certain and positive, insure against unintentional turning of the valve, reduce wear on the valve and seat, avoid the possibility of leakage to the outside of the operating fluid, insure equalization of pressure in the system when the valve is not being turned and make possible a unit of high efficiency, great compactness and little bulk.

I provide apparatus for operating a tapered rotary plug valve comprising first means adapted to be fluid actuated to unseat the plug valve for turning, second means adapted to be fluid actuated to turn the plug valve, fluid compressing means, means selectively conducting compressed fluid from the fluid compressing means to the second means so as to turn the plug valve in one or the other direction and a direct connection from the fluid compressing means to the first means. Thus through a direct connection from the fluid compressing means the unseating means is always operable upon operation of the fluid compressing means regardless of the direction in which the valve is to be turned, i. e., from open to closed position or from closed to open position. A control valve is provided for determining the direction of turning of the plug valve, the connection from the fluid compressing means to the unseating means bypassing the control valve.

I further provide apparatus for operating a tapered rotary plug valve comprising first means adapted to be fluid actuated to unseat the plug valve for turning, second means adapted to be fluid actuated to turn the plug valve, fluid compressing means, a chamber, a duct from the fluid compressing means to the chamber, a duct from the chamber to the first means and means selectively conducting compressed fluid from the chamber to the second means so as to turn the plug valve in one or the other direction. A return duct may be provided from the second means to the chamber. Also a fluid reservoir may be provided communicating with the return duct and the chamber. The fluid reservoir allows for expansion and contraction of the operating fluid and provides a convenient means for replenishing the operating fluid, preferably being open exteriorly of the apparatus and closable with a removable plug.

I also provide apparatus for operating a tapered rotary plug valve comprising first means adapted to be fluid actuated to unseat the plug valve for turning, second means adapted to be fluid actuated to turn the plug valve, fluid compressing means, a duct from the fluid compressing means to the first means, a control valve, a passage from the fluid compressing means to the control valve, two ducts from the control valve to the second means through which selectively, depending on the position of the control valve, compressed fluid is conducted from the control valve to the second means to turn the plug valve in one or the other direction, a return passage from the control valve to the fluid compressing means for delivering to the fluid compressing means fluid returning to the control valve from the second means and means inhibiting retrograde movement of fluid through said passages.

I still further provide apparatus for operating a tapered rotary plug valve comprising first means adapted to be fluid actuated to unseat the plug valve for turning, second means adapted to be fluid actuated to turn the plug valve, fluid compressing means, ducts selectively conducting compressed fluid from the fluid compressing means to the second means so as to turn the plug valve in one or the other direction, a connection from the fluid compressing means to the first means and means for equalizing pressure in said ducts and connection after operation of the fluid compressing means. The pressure equalizing means may be a relatively small duct or passage connecting the ducts mentioned. The relatively small duct or passage may be formed through the control valve. This insures reseating of the plug valve upon completion of the turning movement, proper distribution of the fluid in the system and elimination of pressure strains.

I still further provide apparatus for operating a rotary plug valve comprising a casing in which the valve is mounted for rotation, the casing completely enclosing the valve on all sides and being free from any openings therethrough for movable parts, fluid operable means for turning the valve disposed entirely within the casing, fluid compressing means and duct means from the fluid compressing means to the fluid operable means. This construction obviates the possibility of leakage of operating fluid to the outside through packed joints for movable parts.

The fluid compressing means is preferably carried by the casing and may include a cylinder formed in the casing and a piston operating in the cylinder. Likewise the valve operating means may consist of cylinder means formed in the casing and piston means therein. Duct means between the fluid compressing means and the valve operating means may also be formed in the casing. Thus an extremely simple, foolproof, compact and rugged structure is formed which has exceptionally long life and requires little upkeep.

Other details, objects and advantages of the invention will become apparent as the following description of a present preferred embodiment thereof proceeds.

In the accompanying drawings I have shown a present preferred embodiment of the invention in which Figure 1 is a horizontal cross-sectional view taken on the line I—I of Figure 3 of apparatus for operating a rotary plug valve;

Figure 3 is a central vertical longitudinal cross-sectional view through the apparatus shown in Figures 1 and 2;

Figure 4 is a top plan view of a portion of the structure;

Figure 5 is a vertical transverse cross-sectional view taken on the line V—V of Figure 4; and Figure 6 is a vertical transverse cross-sectional view taken on the line VI—VI of Figure 4.

Figure 2:
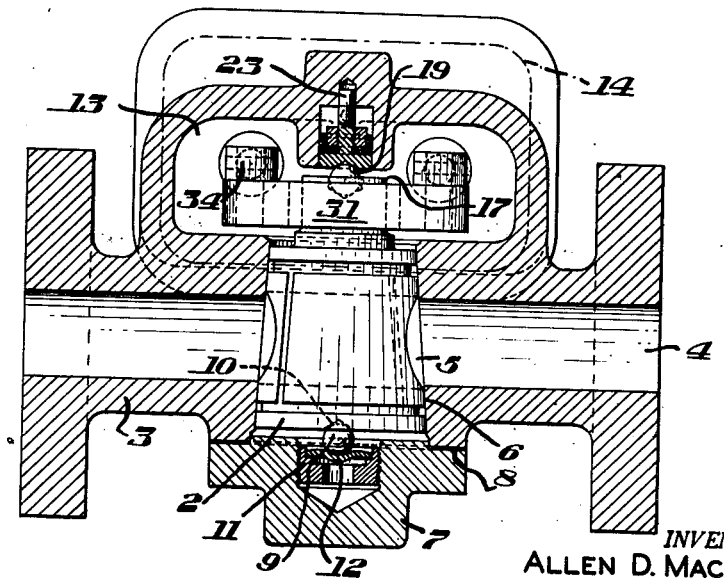
Figure 2 is a vertical transverse cross-sectional view taken on the line II—II of Figure 3 showing a tapered rotary plug valve, its casing and a portion of the apparatus for operating the valve.

Referring now more particularly to the drawings, there is shown a tapered rotary plug valve designated generally by reference numeral 2 mounted in a casing 3. Through the casing is a conduit 4 which is adapted to be closed or opened by the valve 2. The valve 2 has therethrough a passage 5 which may be aligned with the conduit 4 as shown in Figure 2 to render the conduit 4 open or disposed transversely of the conduit 4 by turning the valve 2 through an angle of ninety degrees about its axis to close the conduit 4. In operation the valve 2 is turned in one direction through an angle of ninety degrees between open and closed positions when it is desired to close the conduit 4 and then is turned back in the opposite direction through an angle of ninety degrees when it is desired to open the conduit 4. The valve 2 is shown as being a lubricated tapered rotary plug valve but as the present invention is concerned with the apparatus for operating the valve the details of structure of the valve itself are not of importance.

The valve 2 is adapted to be inserted into a tapered socket or seat 6 in the casing 3 by insertion from the bottom viewing Figure 2. The taper of the valve is preferably the same as the taper of the seat. The seat is opened for insertion of the valve by removal of a removable cover 7 which may be fastened to the casing when in place by any suitable fastening means such as screws not shown. When in place the cover 7 is sealed to the casing by a gasket 8.

The valve 2 is supported upon a ball bearing 9 the upper portion of which is received within a seat 10 formed at the center of the bottom face of the valve. Threaded into the cover 7 is a bushing 11 carrying a resilient plate 12 of spring steel which is downwardly depressed or hollowed at its center to receive the bottom of the ball bearing 9 as shown in Figure 2. The valve 2 is maintained firmly seated in the seat 6 by upward pressure exerted on it through the ball bearing 9 by the resilient plate 12. When the valve is to be turned it is unseated by being moved downwardly a very short distance, perhaps .001 inch, the resilient plate 12 yielding against pressure exerted on the top of the valve to permit the unseating. Unseating of the valve when it is to be turned is desirable because otherwise the friction between the valve and its seat is so great as to render turning of the valve extremely difficult, requiring great power.

The casing 3 has therein above the valve a chamber 13. The casing is formed of three parts, the principal part or body in which the seat 6 and the chamber 13 are formed, the cover 7 and an extension 14 which is bolted to the body of the casing by bolts 15. The casing consisting of the three parts mentioned completely encases the valve and the means presently to be described for unseating and turning the valve. The extension 14 is sealed to the body of the casing by a gasket 16.

At its upper extremity the valve 2 has a stem 17 having a central seat 18 for a ball bearing 19 the upper portion of which is received within a seat 20 in the lower face of a piston 21 operable in a vertical cylinder 22 formed in the upper part of the body of the casing and opening downwardly into the chamber 13. The piston 21 has an upwardly extending stem 23 which is guidingly received within a cylindrical bore 24 in the casing. The piston 21 is packed to the cylinder 22 by packing 25. When the valve 2 is to be turned the piston 21 is pressed downwardly against the ball bearing 19 which in turn moves the valve 2 downwardly through a very short distance as above indicated to unseat the valve sufficiently to relieve the frictional resistance to turning.

Bored into the extension 14 so as to open into the chamber 13 are two longitudinal parallel cylindrical bores 26 and 27 which will hereinafter be referred to as cylinders. Operable in the cylinder 26 is a piston 28 and operable in the cylinder 27 is a piston 29. The pistons are suitably packed as shown and their piston rods extend out of the cylinders into the chamber 13 through glands 30. Any leakage of fluid past the pistons 28 and 29 and the glands 30 enters the chamber 13 and does not pass to the outside.

Figure 1:
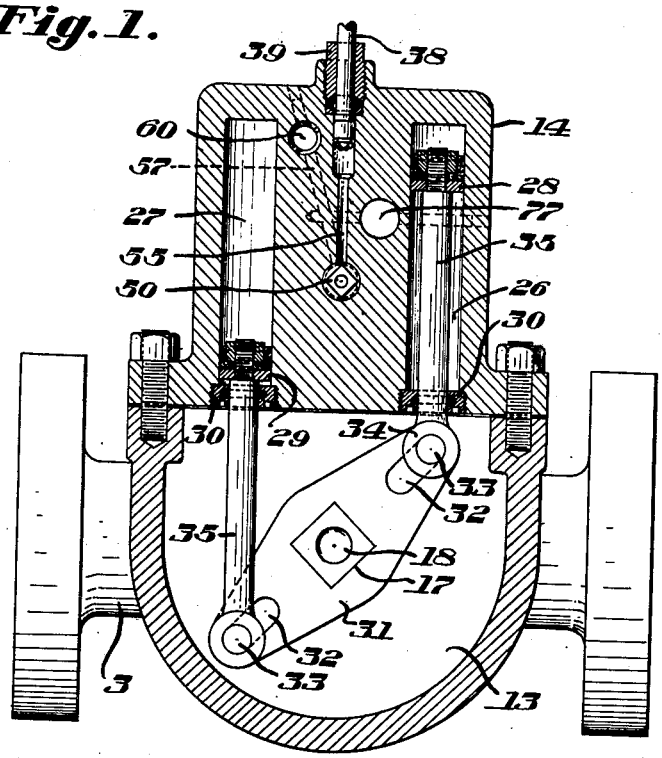

The stem 17 of the valve 2 is square in cross section as shown in Figure 1. Disposed about the stem 17 as by a drive fit is a bar 31 having near each end a slot 32 elongated in the direction of the length of the bar. In each slot 32 is a pin 33. Each pin 33 is received within a hub 34 of a piston rod 35 connected with one of the pistons 28 and 29.

When the piston 28 moves downwardly viewing Figure 1 the valve 2 is turned in the clockwise direction while when the piston 29 is moved downwardly the valve is turned in the counter-clockwise direction. The amplitude of movement of the pistons is such that in a complete movement the valve is turned through approximately ninety degrees. As the parts are shown in Figures 1, 2 and 3, the valve is in open position or in such position that the conduit 4 is open. When the piston 28 is moved to the bottom of the cylinder 26, viewing Figure 1, the valve 2 is turned through ninety degrees to a position in which the passage 5 through the valve is disposed transversely of and out of communication with the conduit 4 whereupon to close the conduit.

There is bored into the extension 14 from the right-hand edge thereof viewing Figures 3 and 4 a cylinder 36 in which operates a piston 37 having a piston rod 38 extending to the outside through a gland 39 and pivoted at 40 to a lever 41. The lever 41 is pivoted at 42 to a link 43 which is pivoted at 44 to a bracket 45 connected with the exterior of the extension 14. The lever 41 has a socket 46 for receiving the end of a bar or handle through which the lever 41 may be oscillated by hand to move the piston 37 back and forth in the cylinder 36. The cylinder 36 and the communicating ducts, passages and chambers as will presently be described are adapted to contain an operating fluid such as oil or other hydraulic fluid and the purpose of the piston 37 is to apply pressure to the fluid to unseat and turn the valve 2.

Intersecting the axis of the cylinder 36 is a stepped bore open at the top of the extension and providing three super-imposed chambers 47, 48, and 49. Threaded into the bore between the chambers 47 and 48 is a check valve casing 50 containing a ball check valve 51 and threaded into the bore between the chambers 48 and 49 is a check valve casing 52 containing a ball check valve 53. The bore is adapted to be closed at the top by a closure plug 54 threaded thereinto. A duct 55 coaxial with the cylinder 36 communicates with the inner end of that cylinder and with the chamber 48. The ball check valve 51 permits flow of fluid upwardly from the chamber 47 to chamber 48 but prevents retrograde or downward flow of fluid. The ball check valve 53 permits flow of fluid upwardly from chamber 48 to chamber 49 but prevents retrograde or downward flow of fluid.

A duct 56 extends from the chamber 49 to the cylinder 22. A duct 57 extends from the chamber 49 to a chamber 58 in which is positioned a control valve 59. The chamber 58 has a smallest cylindrical portion 60 at the bottom, an intermediate cylindrical portion 61 above the portion 60, a tapered portion 62 above the portion 61 and a largest cylindrical portion 63 above the portion 62. The valve 59 is disposed within the portion 62 and is tapered to conform to the taper of the portion 62. A flanged bushing 64 enters the portion 63 of the chamber 58. The valve 59 has a stem 65 extending upwardly through the flanged bushing 64 and a handle 66 for turning the valve 59 is connected with the top of the stem. Packing 67 is disposed about the stem 65 below the bushing 64. A compression coil spring 68 seated against a shoulder 69 between the portions 60 and 61 of the chamber 58 bears upwardly against the bottom of the valve 59.

The valve 59 has in its periphery and extending for a peripheral extent of somewhat greater than ninety degrees a groove 70 which is disposed entirely at the elevation of the duct 57. The valve 59 has in its periphery and extending for a peripheral extent of somewhat greater than ninety degrees a groove 71 whose upper portion is at the elevation of the duct 57 and which extends downwardly to the bottom of the valve so as to communicate with the portions 60 and 61 of the chamber 58. The grooves 70 and 71 are disposed substantially opposite one another in the valve 59. A bleed passage 72 of relatively small diameter extends through the valve 58 between the grooves 70 and 71 so as to establish communication between the grooves.

At the level of the duct 57 a duct 73 extends from the chamber 58 laterally to a vertical duct 74 which extends downwardly from the duct 73 to the cylinder 27 adjacent the upper end thereof viewing Figure 1 or adjacent the right-hand end thereof viewing Figure 4. At the level of the duct 57 a duct 75 extends from the chamber 58 laterally to a vertical duct 76 which extends downwardly from the duct 75 to the cylinder 26 adjacent the upper end thereof viewing Figure 1 or adjacent the right-hand end thereof viewing Figure 4. The ducts 73 and 75 enter the chamber 58 at diametrically opposed points as shown in Figures 4 and 5.

There is provided in the extension 14 a fluid reservoir 77 which is open at the top of the extension and adapted to be closed by a threaded plug 78 through which is a small vent passage 79. The reservoir 77 is adapted to be partially filled with fluid and serves as the filling means when the fluid is to be replenished.

At a level slightly above the bottom of the portion 60 of the chamber 58 a duct 80 extends from the portion 60 of the chamber 58 to the chamber 47. At the level of the duct 80 a duct 81 extends from the reservoir 77 adjacent the bottom thereof to the duct 80.

All of the chambers and ducts normally contain fluid such as oil. The control valve 59 determines whether fluid compressed by the piston 37 will flow to the cylinder 26 or to the cylinder 27. With the control valve 59 in the position shown in Figure 4 fluid under pressure passes to the cylinder 26.

When the piston 37 is moved toward the left viewing Figure 3 fluid is forced from the chamber 48 upwardly past the ball check valve 53 to the chamber 49 because the ball check valve 51 prevents downward flow of fluid from the chamber 48 to the chamber 47. Thus the pressure in the chamber 49 is increased and that increase of pressure is communicated through the duct 56 to the piston 21 and the cylinder 22, forcing that piston downwardly and unseating the plug valve 2. At the same time fluid under pressure flows through the duct 57, the groove 70 in the valve 59, the duct 75 and the duct 76 into the cylinder 26 building up pressure above the piston 28 in viewing Figure 1 and forcing that piston downwardly. At the same time fluid from the cylinder 27 passes through the duct 74, the duct 73, the groove 71 in the valve 59 and the portions 61 and 60 of the chamber 58 and returns through the duct 80 to the chamber 47. Upon the backward stroke (i. e., the stroke toward the right, viewing Figure 3) of the piston 37, the ball check valve 51 opens and fluid from the chamber 47 passes up into the chamber 48. The reservoir 77 is always in communication with the chamber 47 and contains a reserve supply of fluid.

Upon repeated pumping of the piston 37 in the cylinder 36 added increments of fluid are pumped into the cylinder 26 above the piston 28 viewing Figure 1 and repeated increments of fluid are forced out of the cylinder 27 and back to the chamber 48 as above described. If the pump is operated rapidly the valve 2 may substantially remain unseated during repeated increments of turning effected by downward movement of the piston 28 in the cylinder 26. If the pumping is done slowly there may be an opportunity for equalization of pressure through the bleed passage 72 at the end of each stroke in which case the valve 2 may seat momentarily between rotative movements. In any event, at the conclusion of the turning movement of the valve between open and closed positions, which may take perhaps thirty strokes of the pump piston 37, the pressure in the system equalizes through the bleed passage 72 insuring that the plug valve 2 will seat firmly in the position to which it has been moved and relieving the apparatus of strains due to unequal pressures. The bleed passage 72 is so small that it has little or no operative effect when the pump is operated rapidly.

The unseating pressure for the valve 2 does not pass through the control valve 59 but goes directly to the valve 2. All of the moving parts which are likely to leak are disposed within the chamber 13 so there is no leakage therefrom to the outside of the apparatus. The unit is very compact and rugged and light in weight. The ducts in the extension 14 are formed by drilling and the ends of the ducts are plugged as shown.

While I have shown and described a present preferred embodiment of the invention, it is to be distinctly understood that the invention is not limited thereto but may be otherwise variously embodied within the scope of the following claims.

I claim:
1. Apparatus for operating a tapered rotary plug valve comprising first means adapted to be fluid actuated to unseat the plug valve for turning, second means adapted to be fluid actuated to turn the plug valve, fluid pump means, a duct from the fluid pump means to the first means, a control valve, a passage from the fluid pump means to the control valve, two ducts from the control valve to the second means through which selectively, depending on the position of the control valve, fluid under pressure created by the fluid pump means is conducted from the control valve to the second means to turn the plug valve in one or the other direction, a return passage from the control valve to the fluid pump means for delivering to the fluid pump means fluid returning to the control valve from the second means, means inhibiting retrograde movement of fluid through said passages and a relatively small duct connecting said two ducts to each other.

2. Apparatus for operating a tapered rotary plug valve comprising first means adapted to be fluid actuated to unseat the plug valve for turning, second means adapted to be fluid actuated to turn the plug valve, fluid pump means, a duct from the fluid pump means to the first means, a control valve, a passage from the fluid pump means to the control valve, two ducts from the control valve to the second means through which selectively, depending on the position of the control valve, fluid under pressure created by the fluid pump means is conducted from the control valve to the second means to turn the plug valve in one or the other direction, a return passage from the control valve to the fluid pump means for delivering to the fluid pump means fluid returning to the control valve from the second means, means inhibiting retrograde movement of fluid through said passages and a relatively small duct through the control valve connecting said two ducts to each other.

ALLEN D. MacLEAN.

References Cited in the file of this patent

UNITED STATES PATENTS

| Number | Name | Date |
|---|---|---|
| 960,302 | Foster | June 7, 1910 |
| 1,457,156 | Frock | May 29, 1927 |
| 1,546,907 | Krueger | July 21, 1925 |
| 1,672,430 | Schnyder | June 5, 1928 |
| 1,681,588 | Lawson | Aug. 21, 1928 |
| 1,706,309 | Miller | Mar. 19, 1929 |
| 1,806,136 | Weiss | May 19, 1931 |
| 1,875,623 | Longbotham | Sept. 6, 1932 |
| 1,925,215 | Strum | Sept. 5, 1933 |
| 2,001,620 | Levy | May 14, 1935 |
| 2,054,259 | Kinzie | Sept. 15, 1936 |
| 2,085,688 | Schuchman | June 29, 1937 |
| 2,149,725 | Canariis | Mar. 7, 1939 |
| 2,154,038 | Evrell | Apr. 11, 1939 |
| 2,187,036 | Kerber | June 16, 1940 |
| 2,352,390 | Kirkland | June 27, 1944 |